US012587290B2

(12) United States Patent
Ermolov et al.

(10) Patent No.: US 12,587,290 B2
(45) Date of Patent: Mar. 24, 2026

(54) LOCALIZATION VIA MACHINE LEARNING BASED ON PERCEIVED CHANNEL PROPERTIES AND INERTIAL MEASUREMENT UNIT SUPERVISION

(71) Applicant: QUALCOMM Incorporated, San Diego, CA (US)

(72) Inventors: Aleksandr Ermolov, Amsterdam (NL); Bence Major, Amsterdam (NL); Mohammed Ali Mohammed Hirzallah, San Diego, CA (US); Srinivas Yerramalli, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/481,655

(22) Filed: Oct. 5, 2023

(65) Prior Publication Data

US 2024/0372636 A1 Nov. 7, 2024

Related U.S. Application Data

(60) Provisional application No. 63/500,399, filed on May 5, 2023.

(51) Int. Cl.
| | |
|---|---|
| *H04B 17/27* | (2015.01) |
| *H04W 64/00* | (2009.01) |
| *H04B 17/391* | (2015.01) |

(52) U.S. Cl.
CPC .......... *H04B 17/27* (2015.01); *H04W 64/003* (2013.01); *H04B 17/3913* (2015.01)

(58) Field of Classification Search
CPC .. H04B 17/27; H04B 17/3913; H04W 64/003
See application file for complete search history.

(56) References Cited

U.S. PATENT DOCUMENTS

2025/0301440 A1* 9/2025 Lindquist .............. G01S 5/0258

FOREIGN PATENT DOCUMENTS

WO 2018084295 A1 5/2018

OTHER PUBLICATIONS

Arnold M., et al., "Benchmarking Learnt Radio Localization Under Distribution Shift," arXiv:2210.01930v1 [cs.LG] Oct. 4, 2022, pp. 1-26.

(Continued)

*Primary Examiner* — Fred A Casca
(74) *Attorney, Agent, or Firm* — QUALCOMM Incorporated

(57) ABSTRACT

Certain aspects of the present disclosure provide techniques and apparatus for improved machine learning. A sequence of data records is accessed, each data record comprising wireless channel measurements and inertial measurement unit (IMU) data. Known position information corresponding to at least a first data record is accessed. A first sequence of positions is determined by processing the sets of IMU data and known position information using a forward operation. A second sequence of positions is determined by processing the sets of IMU data and known position information using a backward operation. An IMU adjustment parameter is generated using the first and second sequences of positions. A pseudo-label is generated for a second data record using the IMU adjustment parameter and the sets of IMU data. A machine learning model is trained, using the second data record and the pseudo-label, to predict positions using one or more wireless channel measurements.

30 Claims, 8 Drawing Sheets

(56) References Cited

OTHER PUBLICATIONS

Arnold M., et al., "Novel Massive MIMO Channel Sounding Data Applied to Deep Learning-based Indoor Positioning," SCC 2019, 12th International ITG Conference on Systems, Communications and Coding. VDE, 2019, pp. 119-124.
Del Peral-Rosado J.A., et al., "Survey of Cellular Mobile Radio Localization Methods: From 1g to 5g," IEEE Communications Surveys Tutorials, vol. 20, No. 2, 2017, 25 Pages.
Gill K.S., et al., "Three-way Deep Neural Network for Radio Frequency Map Generation and Source Localization," arXiv:2111.12175v1 [cs.LG] Nov. 23, 2021, pp. 1-5.
Herath S., et al., "Fusion-DHL: WiFi, IMU, and Floorplan Fusion for Dense History of Locations in Indoor Environments", arXiv:2105.08837v1 [cs.RO] May 18, 2021, 7 Pages.
Kadambi S., et al., "Neural RF SLAM for Unsupervised Positioning and Mapping with Channel State Information," arXiv:2203.08264v1 [cs.IT], ICC 2022—IEEE International Conference on Communications, Mar. 15, 2022, 7 Pages.
Karmanov I., et al., "WiCluster: Passive Indoor 2D/3D Positioning Using WiFi Without Precise Labels", arxiv.org, Cornell University Library, 201 Olin Library Cornell University Ithaca, NY 14853, Sep. 27, 2021, XP091045871, 7 Pages, Sections III and V.C, Figures 3,4,8.
Khalajmehrabadi A., et al., "Modern WLAN Fingerprinting Indoor Positioning Methods and Deployment Challenges," IEEE Communications Surveys Tutorials, vol. 19, No. 3, 2017, pp. 1-30.
Li J., et al., "Accurate 3D Localization for MAV Swarms by UWB and IMU Fusion", arXiv:1807.10913v1 [cs.RO] Jul. 28, 2018, 6 Pages.
Liu J., et al., "Autloc: Deep Autoencoder for Indoor Localization with RSS Fingerprinting," 10th International Conference on Wireless Communications and Signal Processing (WCSP), IEEE, 2018, 6 Pages.
Long K., et al., "A CSI-Based Indoor Positioning System Using Single UWB Ranging Correction," Sensors, vol. 21, No. 19, 6447, Sep. 27, 2021, pp. 1-21.

REMCOM: "Wireless InSite 3D Wireless Prediction Software", 2022, 13 Pages.
Savic V., et al., "Fingerprinting-based Positioning in Distributed Massive Mimo Systems," IEEE 82nd Vehicular Technology Conference (VTC2015—Fall), 2015, 5 Pages.
Studer C., et al., "Channel Charting: Locating Users Within the Radio Environment Using Channel State Information," IEEE Access, vol. 6, 2018, pp. 1-17.
Vieira J., et al., "Deep Convolutional Neural Networks for Massive Mimo Fingerprint-based Positioning," arXiv:1708.06235v1 [stat.ML] IEEE 28th Annual International Symposium on Personal, Indoor, and Mobile Radio Communications (PIMRC), Aug. 21, 2017, pp. 1-6.
Yang C., et al., "A Novel Deep Learning Approach to 5g CSI/Geomagnetism/VIO Fused Indoor Localization," Sensors, vol. 23, No. 3, Sensors 2023, 23, 1311, 2023, pp. 1-19.
Yu J., et al., "Multi-modal Recurrent Fusion for Indoor Localization," ICASSP 2022 IEEE International Conference on Acoustics, Speech and Signal Processing (ICASSP), 2022, 5 Pages.
Zanjani F.G., et al., "Modality-agnostic Topology Aware Localization," Advances in Neural Information Processing Systems, 35th Conference on Neural Information Processing Systems, vol. 34, 2021, 12 Pages.
Zhang B., et al., "CSI-Fingerprinting Indoor Localization via Attention-augmented Residual Convolutional Neural Network," IEEE Transactions on Wireless Communications, 2023, pp. 1-32.
International Search Report and Written Opinion—PCT/US2024/023868—ISA/EPO—Jul. 23, 2024.
Khassanov Y., et al., "Finer-level Sequential WiFi-based Indoor Localization", 2021 IEEE/SICE International Symposium on System Integration (SII), IEEE, Jan. 11, 2021, pp. 163-169, XP033891108, pp. 164, 165.
Wang X., et al., "CSI-based Fingerprinting for Indoor Localization: a Deep Learning Approach", IEEE Transactions on Vehicular Technology, [Online], vol. 66, Jan. 1, 2016 , pp. 1-1, XP093006787, pp. 763-776, pp. 768, 769.

* cited by examiner

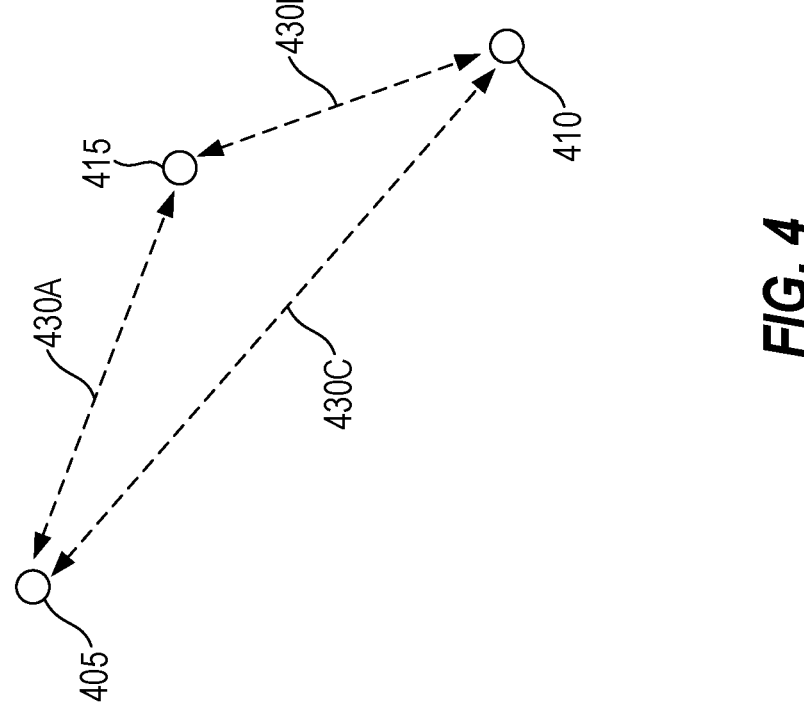
*FIG. 4*

500

600

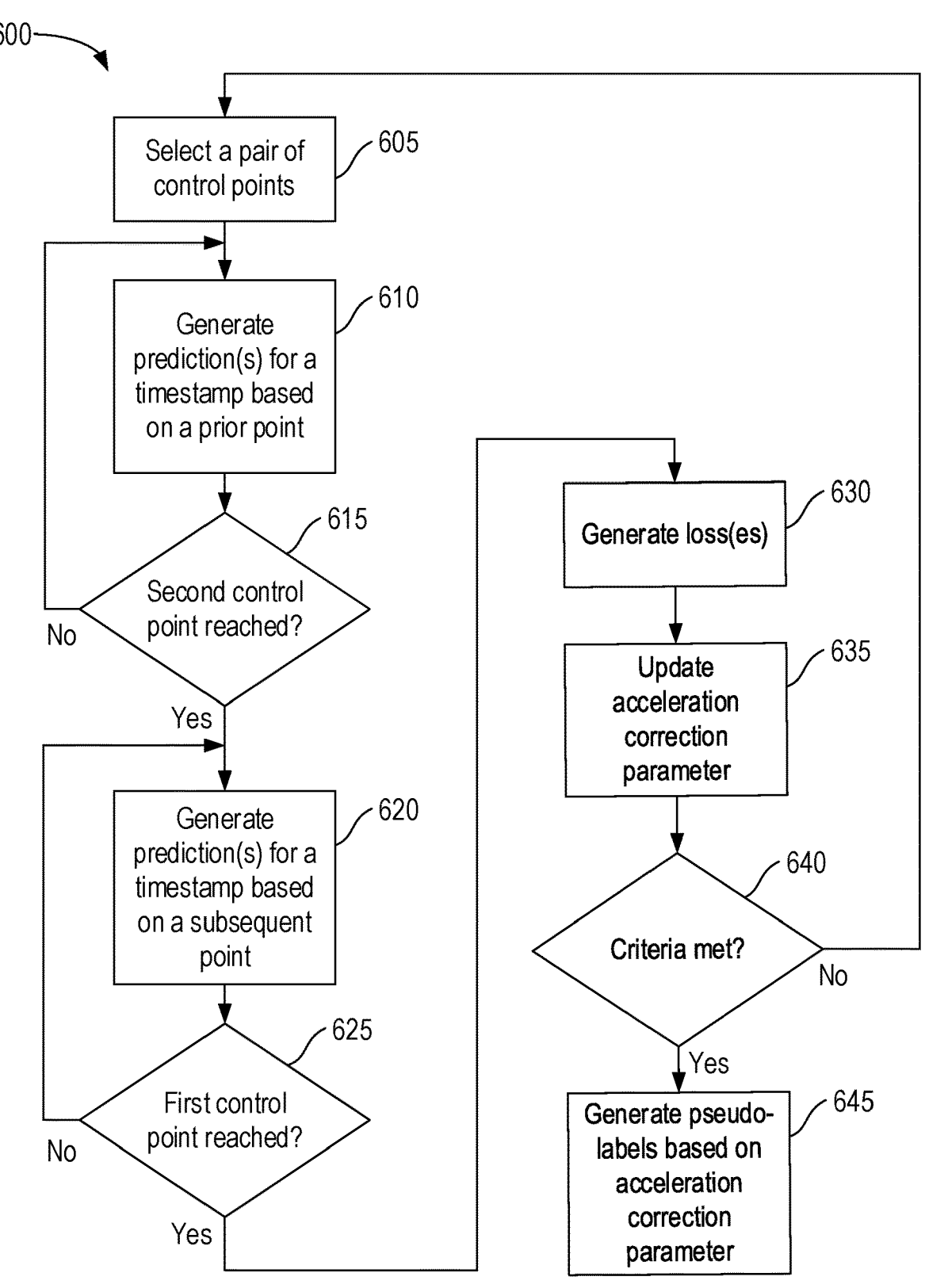

Select a pair of control points — 605

Generate prediction(s) for a timestamp based on a prior point — 610

Second control point reached? — 615

No

Yes

Generate prediction(s) for a timestamp based on a subsequent point — 620

First control point reached? — 625

No

Yes

Generate loss(es) — 630

Update acceleration correction parameter — 635

Criteria met? — 640

No

Yes

Generate pseudo-labels based on acceleration correction parameter — 645

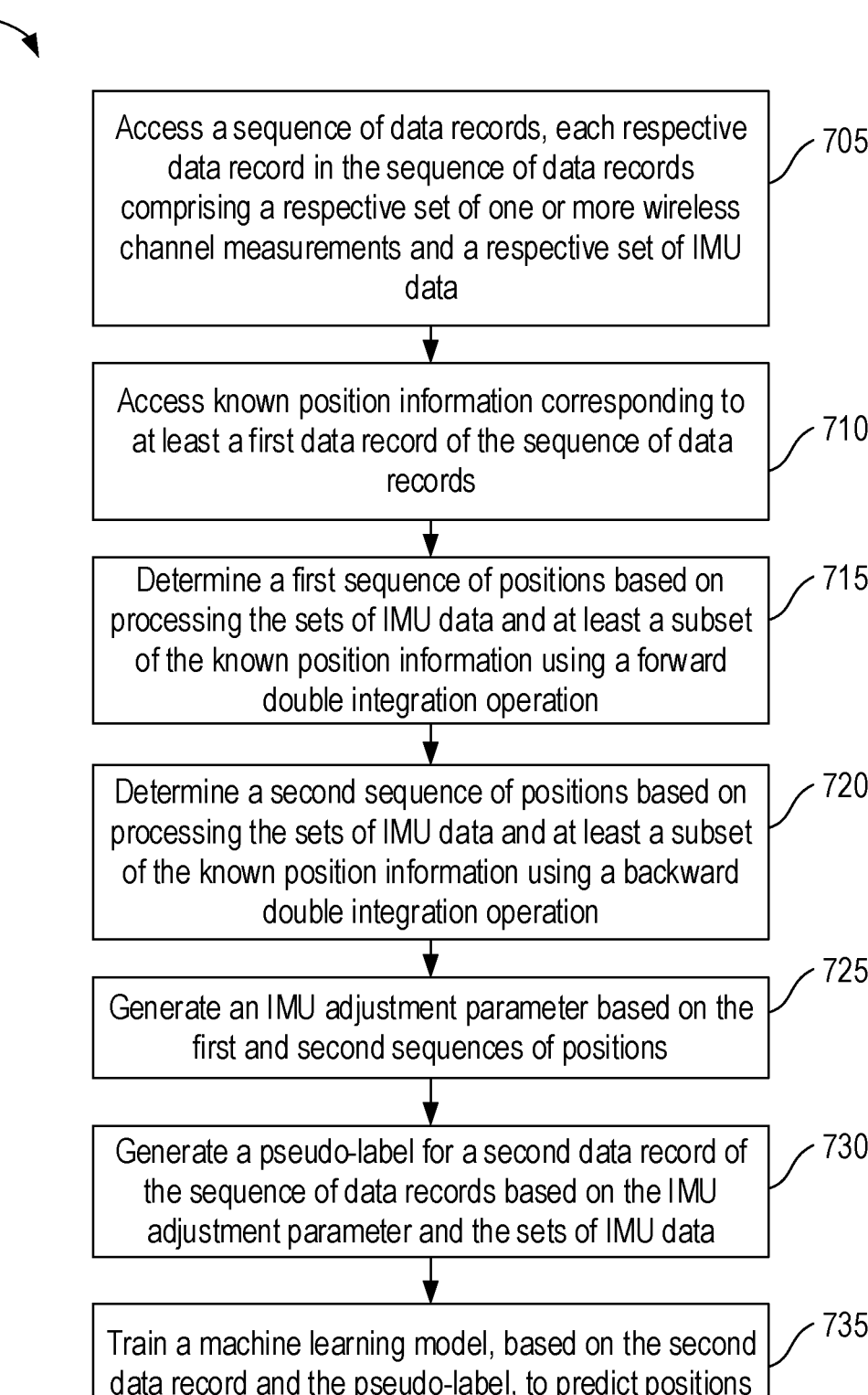

Access a sequence of data records, each respective data record in the sequence of data records comprising a respective set of one or more wireless channel measurements and a respective set of IMU data

705

Access known position information corresponding to at least a first data record of the sequence of data records

710

Determine a first sequence of positions based on processing the sets of IMU data and at least a subset of the known position information using a forward double integration operation

715

Determine a second sequence of positions based on processing the sets of IMU data and at least a subset of the known position information using a backward double integration operation

720

Generate an IMU adjustment parameter based on the first and second sequences of positions

725

Generate a pseudo-label for a second data record of the sequence of data records based on the IMU adjustment parameter and the sets of IMU data

730

Train a machine learning model, based on the second data record and the pseudo-label, to predict positions based on wireless channel measurements

LOCALIZATION VIA MACHINE LEARNING BASED ON PERCEIVED CHANNEL PROPERTIES AND INERTIAL MEASUREMENT UNIT SUPERVISION

CROSS-REFERENCE TO RELATED APPLICATIONS

This application claims the benefit of and priority to U.S. Provisional Patent Application No. 63/500,399, filed May 5, 2023, the entire contents of which are incorporated herein by reference.

INTRODUCTION

Aspects of the present disclosure relate to machine learning.

Location estimation may be used in a variety of applications. For example, devices may use three-dimensional ego-localization techniques for location estimation, which may allow a device to determine its own location in a spatial environment from a first person view (e.g., from the perspective of the device itself). Three-dimensional ego-localization may also allow for the determination of a location of an object in a three-dimensional space from a third person view (e.g., a view through which the object is observed). Various types of data may be used in location estimation in order to determine (or predict) the location of a device in the spatial environment. For example, information derived from wireless channel measurements may be used to predict the location of the device, and the resulting location estimate can be used to aid navigation, as well as in identifying various parameters for subsequent transmissions in the wireless communications system, such as one or more directional beams to use in communicating between a network entity, such as a base station, and a user equipment, to identify beamforming patterns to apply to allow for directionality in signal processing, and the like. In another example, a series of images can be used to predict the location of the device in a three-dimensional space.

Various techniques can be used for location estimation in spatial environments. For example, various machine learning models trained using supervised learning techniques on labeled data can be used for location estimation. Other models may use a defined three-dimensional model of the spatial environment to estimate the location of a device in a spatial environment. In another example, simultaneous localization and mapping (SLAM) techniques can be used to simultaneously build a map of the spatial environment and estimate the location of a device. Generally, these models may take an input including label data that may not be known. Further, these models may be limited to data in the visual domain (e.g., data in the visible spectrum between 480 nm and 720 nm or in other spectra from which an image can be generated) and may not account for data from other modalities that can enhance visual data and illustrate additional details in the spatial environment that may be unknown in the visual domain.

Accordingly, what is needed are improved techniques for predicting spatial location using machine learning models.

BRIEF SUMMARY

Certain aspects of the present disclosure provide a processor-implemented method, comprising: accessing a sequence of data records, each respective data record in the sequence of data records comprising a respective set of one or more wireless channel measurements and a respective set of inertial measurement unit (IMU) data; accessing known position information corresponding to at least a first data record of the sequence of data records; determining a first sequence of positions based on processing the sets of IMU data and at least a subset of the known position information using a forward double integration operation; determining a second sequence of positions based on processing the sets of IMU data and at least a subset of the known position information using a backward double integration operation; generating an IMU adjustment parameter based on the first and second sequences of positions; generating a pseudo-label for a second data record of the sequence of data records based on the IMU adjustment parameter and the sets of IMU data; and training a machine learning model, based on the second data record and the pseudo-label, to predict positions based on wireless channel measurements.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

FIG. 4 depicts an example workflow for updating pseudo-labels based on trained model output, according to some aspects of the present disclosure.

FIG. 6 is a flow diagram depicting an example method for generating pseudo-labels, according to some aspects of the present disclosure.

FIG. 7 is a flow diagram depicting an example method for training machine learning models to perform localization, according to some aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
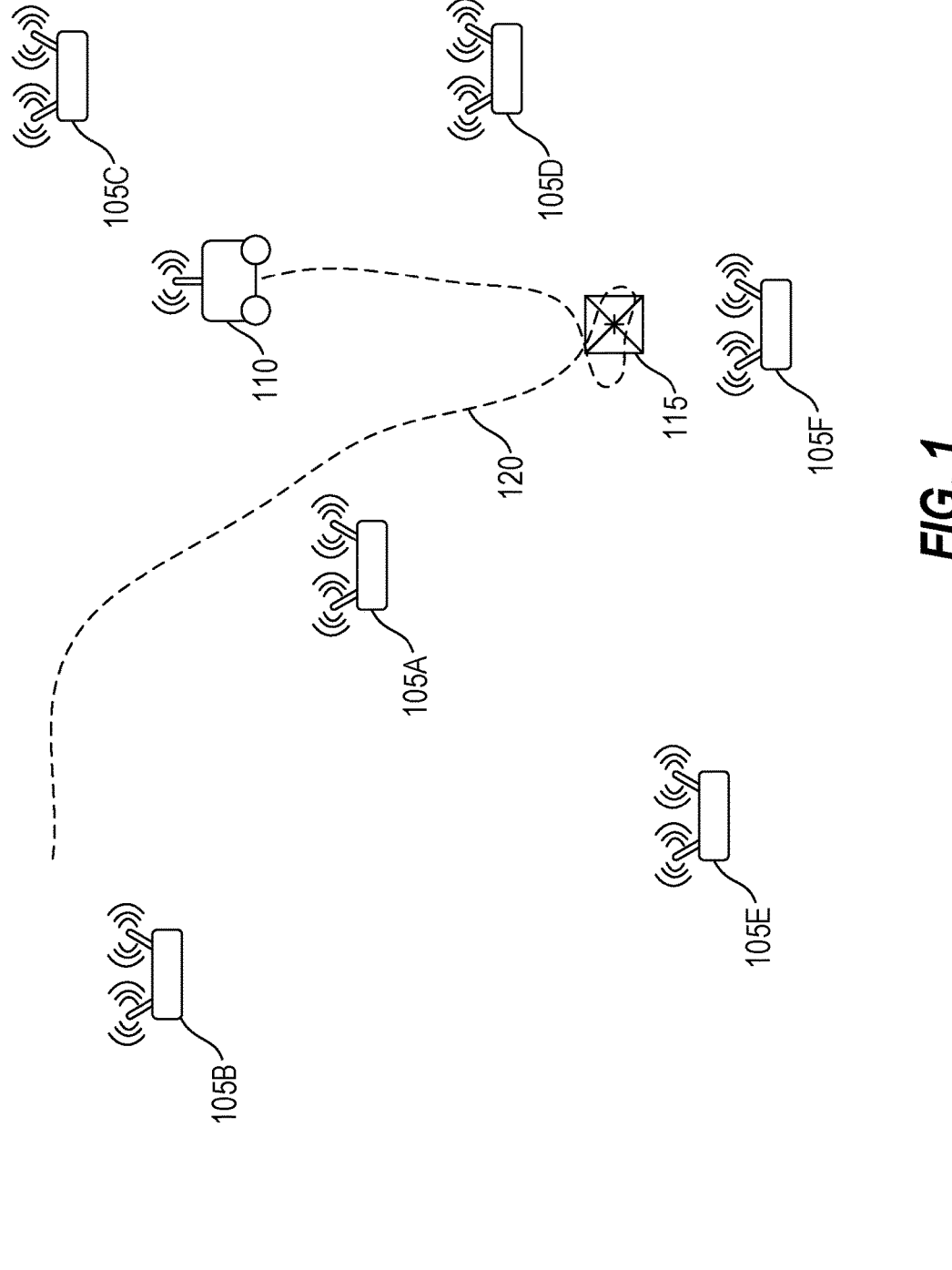
FIG. 1 depicts an example environment for generating training data to train machine learning models for localization, according to some aspects of the present disclosure.

Aspects of the present disclosure provide apparatuses, methods, processing systems, and non-transitory computer-readable mediums for providing improved supervision in machine learning models.

In some aspects of the present disclosure, the location(s) of device(s) can be determined based on wireless channel properties (e.g., collected channel state information (CSI) measurements) using trained machine learning models. That is, based on processing the measured or collected CSI (for uplink and/or downlink data to and/or from the device) using one or more trained machine learning models, the physical position of the device may be predicted.

Generally, some conventional approaches to training of machine-learning-based positioning systems rely on pairs of data: input data (such as CSI measurements) and corresponding position coordinates (used as labels for supervised learning). In many conventional systems, these labels cover the target environment densely (with many measurements at many locations, such as at least one measurement at each feasible position in the space). If such dense labels or position data are not available, many conventional models overfit to the provided data and fail to generalize to the space. However, such dense collection of position labels is often impractical or impossible in realistic environments. For example, sources of such dense labels often include use of other technologies such as light detection and ranging (LIDAR), which may not be available in some scenarios. Additionally, when such other technologies are available to facilitate dense labeling, these other technologies are generally expensive and computationally costly (e.g., in terms of electrical energy and computing power consumed).

Inertial measurement unit (IMU) sensors, in contrast, are widely available and can be readily integrated into many devices (or are already included in such devices). Generally, IMUs consume relatively little power and computational resources, as compared to conventional positioning systems. IMUs may output a variety of information, such as linear acceleration along one or more dimensions (e.g., one or more acceleration vectors), angular rate information (e.g., the rate at which the IMU is rotating around one or more axes), orientation information (e.g., based on a compass), and the like. However, IMU information is often noisy, which can result in reduced accuracy. For example, though IMU information can theoretically be used for dead reckoning (e.g., inferring the position of an object based on its previous position and movement), the noisy nature of the data compounds over time and the predicted positions can rapidly become highly inaccurate.

In some aspects of the present disclosure, accurate position measurements (for training a model) can be generated algorithmically using a forward-backward double integration process to generate pseudo-labels based on IMU measurements. In some aspects, the pseudo-labels are also generated based on a (relatively small) set of sparse control points. That is, the control points may be sparse in that there may be substantially more "non-control" points in the space, as compared to the number and placement of control points. As used herein, control points correspond to locations where the system can determine the device locations precisely (e.g., using quick response (QR) codes on the floor or other surface) and/or in areas where positioning is available with high accuracy (e.g., using time-of-flight ranging techniques). Stated differently, control points may refer to locations in the physical environment where accurate or reliable labels exist (e.g., where the ground-truth location of the object can be determined), while non-control points correspond to locations in the physical environment where such accurate labels do not exist (e.g., where the ground-truth location of the object is unknown).

In some aspects, data is collected while a device moves through the physical environment. For example, at each point in time (delineated by time steps, also referred to as intervals, such as every 100 milliseconds), a variety of data including the current timestamp, current CSI measurements (which may include uplink data from the device to one or more wireless transmitters and/or receivers and/or downlink data from one or more wireless transmitters and/or receivers to the device), and current IMU data (e.g., linear accelerations along one or more dimensions) may be recorded. In some aspects, if the device is passing or near a control point such that position and velocity can be determined using the control point (e.g., based on the position of a QR code relative to the device), the recorded data may further include this determined position and velocity information at the point in time.

In some aspects, to generate pseudo-labels for the recorded CSI data at each time point, a training (or preprocessing) system can fit the trajectory of the device between control points by using IMU data for each point. That is, while the position of the device may be known with relative certainty for times corresponding to when the device was at or near a control point (and these times therefore have reliable position labels), the CSI records between these control points are generally recorded in unknown locations (and therefore lack position labels). In some aspects, therefore, the system can evaluate the IMU data to fit a predicted trajectory that the device took.

In some aspects, the trajectory-fitting algorithm may be referred to as a forward-backward double integration operation. This operation uses, as input: $\Delta t_i$ (the time difference between points in the recorded data), $a_i^{IMU}$ (acceleration data obtained from the IMU at each time point, also referred to as a time step), and the positions and velocities of the device in, at, or near control points. In some aspects, the position of the device at each time point can then be recovered or predicted using double integration, where the velocity at each time point can be derived based on the measured acceleration at each time point. The position at each time point can then be derived based on the predicted velocity at each time point.

In some aspects, for each time point n, the system may predict the velocity $V_n$ based on the previous velocity $V_{n-1}$ (the velocity of the prior time point), the IMU-measured acceleration of the current time point $a_n$ and/or the measured acceleration of the prior time point $a_{n-1}$, and the time step interval $\Delta t_n$ (e.g., the length of time between adjacent records). For example, the system may determine or predict the velocity at each time point as $V_n = V_{n-1} + a_n \Delta t_n$.

Additionally, once velocities at each time point have been predicted, the system can similarly determine or predict the position information for each time point. Specifically, for each time point n, the system may predict the position $x_n$ based on the previous position (the position of the prior time) $x_{n-1}$, the derived or predicted velocity of the current time point $V_n$, and the time step interval $\Delta t_n$. For example, the system may determine or predict the velocity at each time point as $x_n = x_{n-1} + V_n \Delta t_n$.

In some aspects, as discussed above, IMUs may generate relatively noisy data. In some aspects, therefore, the system can use a combined forward and backward double integration operation to remediate (i.e., remove or reduce) such errors. Specifically, the system may use Equations 1 and 2 below to generate predicted velocities and predicted positions for each training record or point in time, with respect to a forward integration pass (e.g., where the system begins the integration with known information at a first control point and derives predicted information at subsequent points in time until a second control point is reached). In Equations 1 and 2 below. $V_n^F$ is the (actual or predicted) velocity at time n with respect to the forward integration (e.g., the velocity predicted during the forward pass), $V_{n-1}^F$ is the (actual or predicted) velocity at the previous time point (e.g., at time n−1) with respect to the forward integration (e.g., predicted during the forward pass), $\widetilde{a_n}$ is a corrected acceleration measurement at time n (as discussed in more detail below), $\Delta t_n$ is the time interval between the prior time point and the current time point, $x_n^F$ is the (actual or predicted) position of the device at the current time point with respect to the forward integration (e.g., predicted during the forward pass), and $x_{n-1}^F$ is the (actual or predicted) position at the previous time point (e.g., at time n−1) with respect to the forward integration.

$$V_n^F = V_{n-1}^F + \widetilde{a_n}\Delta t_n \qquad (1)$$

$$x_n^F = x_{n-1}^F + V_n^F \Delta t_n \qquad (2)$$

In some aspects, to enable correction based on IMU error, the system may also use Equations 3 and 4 below to generate predicted velocities and predicted positions for each training record or point in time, with respect to or during a backward integration pass (e.g., where the system begins the integration with known information at the second control point and derives predicted information at prior points in time until the first control point is reached). In Equations 3 and 4 below, $V_n^B$ is the (actual or predicted) velocity at time n with respect to the backward integration (e.g., predicted during the backward pass), $V_{n-1}^B$ is the (actual or predicted) velocity at the previous time point (e.g., at time n−1) with respect to the backward integration, $x_n^B$ is the (actual or predicted) position of the device at the current time point with respect to the backward integration, and $x_{n-1}^B$ is the (actual or predicted) position at the previous time point (e.g., at time n−1) with respect to the backward integration.

$$V_{n-1}^B = V_n^B - \widetilde{a_n}\Delta t_n \qquad (3)$$

$$x_{n-1}^B = x_n^B - V_n^B \Delta t_n \qquad (4)$$

In some aspects, the integration can generally begin at any control point, working forwards (or backwards) to a subsequent (or prior) control point. That is, the "forward pass" may refer to integrating forward in time (beginning at a known position when the device passed a first control point at a first point in time, and ending at a known position when the device passed a second control point at a second point in time, where the second point in time is subsequent to the first point in time). Similarly, the "backward pass" may refer to integrating backwards in time (beginning at a known position when the device passed a third control point at a third point in time, and ending at a known position when the device passed a fourth control point at a fourth point in time, where the fourth point in time is prior to the third point in time). Notably, in some aspects, the beginning and ending control points of the forward and/or backward pass may actually be the same control point in the space (e.g., if the device made a circuit or loop and returned to the same control point where the device began). Similarly, in some aspects, the beginning control point of the forward pass may be the ending control point of the backward pass, and the ending control point of the forward pass may be the beginning control point of the backward pass.

In some aspects, the corrected acceleration $\widetilde{a_n}$ for each time point n may be defined using Equation 5 below, where $a_n^{IMU}$ is the acceleration vector provided by the IMU for the time point n and $a_n^{cor}$ is a correction parameter (referred to in some aspects as an IMU correction parameter) for the time point n that can compensate for, or at least reduce, noise drift in the IMU data. In some aspects, the correction parameter is trained or learned, as discussed in more detail below. In some aspects, the measured IMU acceleration and correction parameter are both vectors.

$$\widetilde{a_n} = a_n^{IMU} + a_n^{cor} \qquad (5)$$

The result of the forward pass is a trajectory consisting of predicted positions of the device for each timestamp. Similarly, the backward pass results in a trajectory consisting of predicted positions for each timestamp. In some aspects, the system trains or learns the correction parameter for each point or timestamp based on comparing the predicted velocities and positions generated during the forward integration and the backward integration. For example, for each respective time point or timestamp, the system may determine the difference between the velocity and position as predicted during the forward integration and the velocity and position as predicted during the backward integration. To train the acceleration correction parameter (more generally referred to as an IMU adjustment parameter), the system may seek to minimize these differences.

In some aspects, the system generates one or more loss terms, such as a position loss, a velocity loss, and/or a regularization loss. For example, the system may use Equations 6, 7, and 8, below to define the loss terms, where $L_x$ is the position loss, $\mathcal{L}_V$ is the velocity loss, and $\mathcal{L}_{reg}$ is the regularization loss. In this way, the position and velocity losses may be defined as the sum of the squared differences between the predictions at each time point, and the regularization loss may be defined as the sum of the squared L2 norm of the correction parameters (e.g., the length of the correction vector, or the Euclidean norm) for each time point.

$$\mathcal{L}_x = \sum \left\| x_i^F - x_i^B \right\|_2^2 \qquad (6)$$

$$\mathcal{L}_V = \sum \left\| V_i^F - V_i^B \right\|_2^2 \qquad (7)$$

$$\mathcal{L}_{reg} = \sum \left\| a_i^{cor} \right\|_2^2 \qquad (8)$$

In some aspects, the system can sum the position, velocity, and/or regularization loss (either directly or using hyperparameter or learned weights for each term). By seeking to minimize these loss terms (or the summed term), the system can learn an optimal acceleration correction vector for each time point in the sequence.

In some aspects, once learned, the optimized acceleration correction parameters can be used to generate pseudo-labels for each time point. That is, the system may use double integration using the trained correction parameter to correct, or at least adjust, the measured acceleration vector at each time point in order to generate a predicted position, which can be used as the label for the time point (in association with the measured CSI data, which acts as the input data).

Example Environment for Generating Training Data to Train Machine Learning Models for Localization FIG. 1 depicts an example environment 100 for generating training data to train machine learning models for localization.

In the illustrated example, a device 110 can move around the physical environment 100, as indicated by the dashed line 120. That is, the dashed line 120 may indicate the path the device 110 took as the device moved through the physical environment 100. In aspects, the movement of the device 110 may include autonomous movement (e.g., where the device 110 corresponds to an autonomous vehicle such as a robot) and/or guided movement (e.g., where the device 110 follows a defined track or path, or where a user or other entity carries or moves the device 110). In some aspects, the device 110 corresponds to user equipment (UE), an automated guided vehicle (AGV), and the like.

The illustrated environment 100 also includes a number of transceivers 105A-F (collectively, transceivers 105), which may generally be used to provide wireless communications to devices in the environment (such as the device 110). In some aspects, the transceivers 105 provide a wireless network, such as a wireless local area network (WLAN) (e.g., a WiFi network). Though the illustrated example depicts a collection of transceivers 105, in some aspects, the environment may include one or more dedicated receivers and/or one or more dedicated transmitters in addition to or instead of the transceivers 105. Generally, the specific network technology used may vary depending on the particular implementation, and may include a variety of network types including cellular networks, Fifth Generation (5G) networks, and the like.

In the illustrated example, the environment 100 further includes at least one control point 115. As discussed above, the control point 115 generally corresponds to a point or area in the environment 100 where the position and/or velocity of the device 110 can be determined with high confidence or accuracy. For example, the control point 115 may correspond to a QR code (e.g., on the floor), and the device 110 may use a downward-facing camera to identify the QR code. When the point is identified, the device 110 may readily infer that the device is located at the position of the control point 115 (or at some offset from this control point position, based on where the QR code is depicted in the captured images). Additionally, based on the perceived movement of the QR code between captured image frames, the device 110 may determine its velocity vector and/or acceleration vector as the device passes the control point 115. In some aspects, in addition to or instead of the device 110 identifying the control point 115, the control point 115 (or another device or system) may identify or recognize the device 110 when the device is in the vicinity of the point.

In some aspects, to collect training data, CSI data and/or IMU data may be collected as the device 110 moves through the environment 100. For example, for each time point (e.g., every one hundred milliseconds), the device 110 may capture, record, or otherwise determine IMU data (e.g., one or more acceleration vectors) of the device 110. Additionally or alternatively, for each such time point (e.g., at each time-stamp), the device 110 and/or the transceivers 105 (or other components) may determine the channel measurement (e.g., a CSI measurement for the device 110) based on uplink and/or downlink data between the device 110 and one or more transceivers 105.

In some aspects, each time the device 110 passes a control point 115, a ground-truth position, velocity, and/or acceleration of the device 110 at the time may be recorded as well. As discussed above and in more detail below, these "ground-truth" records may then be used as endpoints in the forward-backward double integration process, allowing the system to predict pseudo-labels for each interim time point between the ground-truth endpoints.

In some aspects, this generated training data can then be used to train one or more machine learning models, such as a neural network, to predict the locations of devices based on measured CSI data for the device at any given time in the environment 100. For example, during the training phase, the CSI data for a given time point may be used as input to the model to generate a predicted position in the environment 100. This position may be compared against the generated pseudo-label (or ground-truth label, if the CSI data corresponds to a time when the device 110 passed a control point 115) to generate a loss, which can be used to refine the model (e.g., using stochastic gradient descent and/or batch gradient descent).

After training, the model may be used to process newly collected CSI data (without an accompanying label) to generate a predicted location or position for the device associated with the CSI measurement (e.g., the device that was receiving and/or transmitting the data used to generate the CSI measurement).

Because the training data can be generated and labeled automatically, aspects of the present disclosure enable rapid and efficient deployment of the positioning system to new environments, as well as improved prediction accuracy achieved using the automatic pseudo-labels and large number of automatically generated training records.

Figure 2:
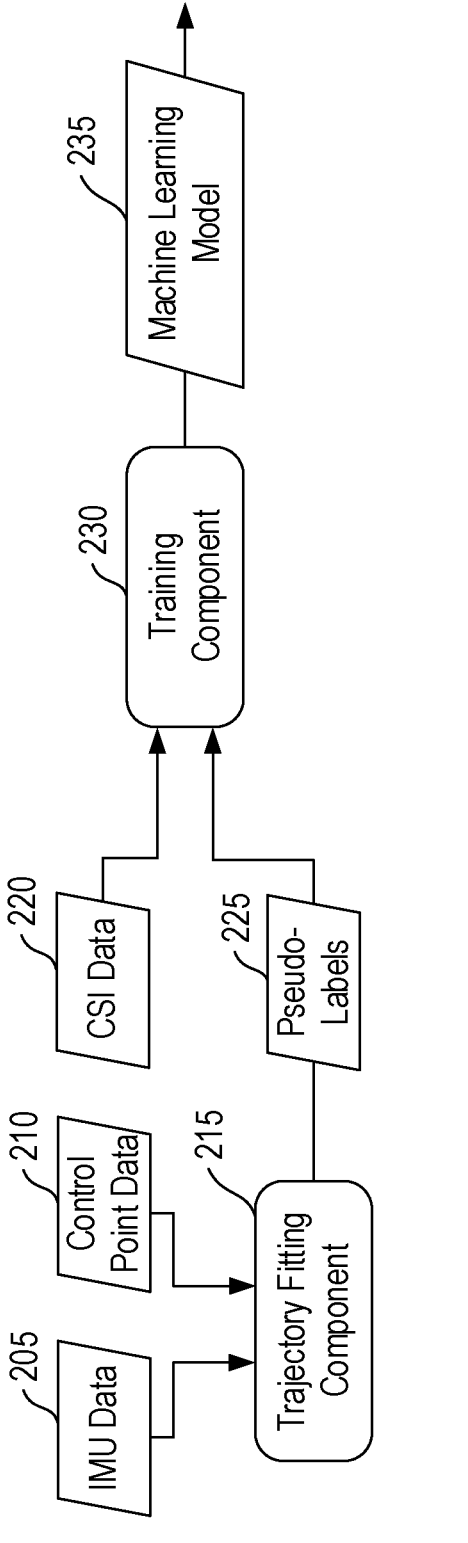
FIG. 2 depicts an example workflow for generating training data and training machine learning models to perform localization, according to some aspects of the present disclosure.

Example Workflow for Generating Training Data and Training Machine Learning Models to Perform Localization FIG. 2 depicts an example workflow 200 for generating training data and training machine learning models to perform localization.

In the illustrated example, as one or more devices (e.g., device 110) move around an environment, IMU data 205, CSI data 220, and control point data 210 are collected. That is, for each timestamp, the system may collect or determine CSI data 220 and IMU data 205 of the moving device. Additionally, the system can further collect control point data 210 for any timestamps when the device passes or detects (or is detected by) such points (e.g., a position, velocity, and/or acceleration), as discussed above.

As illustrated, a trajectory-fitting component 215 can perform a trajectory-fitting operation, as discussed above and in more detail below, to generate one or more pseudo-labels 225 for one or more of the records of CSI data 220. The pseudo-labels generally indicate predicted position information for the device at the time when the CSI data 220 was collected, determined based on the IMU data 205 and control point data 210.

As illustrated, the CSI data 220 and pseudo-labels 225 (collectively referred to as training data or records in some aspects) are then accessed by a training component 230 to train a machine learning model 235. As used herein, "accessing" data can generally include receiving, requesting, generating, measuring, retrieving, or otherwise gaining access to the data. As discussed above, the trained machine learning model 235 can be used to predict device position based on CSI measurements.

In some aspects, the particular techniques used to collect, generate, and/or process the CSI data 220, IMU data 205, control point data 210, and/or pseudo-labels 225 may vary depending on the particular implementation. For example, in some aspects, the device or user equipment may report (e.g., to the network or training system) that the device has the capability to collect IMU data 205 and/or to generate pseudo-labels 225. Such pseudo-labels 225 may then be generated and reported to the network by the device itself. In some aspects, the device may alternatively report the IMU data 205 (and, in some aspects, the CSI data 220) to the network/training system, allowing the training system to generate the pseudo-labels 225.

In some aspects, when a positioning session is active and/or data collection is ongoing, the network or training system may trigger the device to begin reporting pseudo-labels 225, IMU data 205, CSI data 220, and/or control point data 210. In some aspects, in addition to or instead of using control points (e.g., QR codes) recognizable by the mobile device, the network or training system may configure or instruct the device to use one or more other positioning methods periodically (or deterministically) to determine the control points (e.g., using time-of-flight-based techniques). That is, rather than (or in addition to) relying on physical control points in the space, the system may periodically use one or more other positioning techniques (which may be accurate, but may be prohibitively computationally expensive for continuous use). This allows the system to generate and insert artificial control points in the records. For example, in some aspects, the device may use such positioning techniques to generate control point data 210 if a physical control point (e.g., a QR code) has not been reached or identified for at least a period of time (e.g., for at least 5 minutes).

Additionally or alternatively, in some aspects, the network or training system may dynamically indicate, to the device, to use a certain time interval of reference signal (e.g., a positioning reference signal (PRS) and/or sounding referencing signal (SRS) transmissions) to determine the location of control points (e.g., using a medium access control (MAC) control element (MAC-CE) and/or downlink control information (DCI)).

In some aspects, rather than reporting full IMU data at each time point, the devices may report only the delta position (e.g., change in position), which can be obtained by integration of the IMU data by the device. The network or training system can then determine the acceleration and velocity using differencing of the reported delta position data, and then use these derived data points to perform aspects of the present disclosure. In some aspects, however, the raw IMU sensor data can be reported to the network or training system such that any errors due to integrating first and differencing later can be avoided.

In some aspects, the mobile device reports the pseudo-labels to the network for all points between any two control points (which may be different physical points, or may, in fact, be the same physical location at different times). In some aspects, the timestamp and the pseudo-label can be reported in a list or batch fashion. In some aspects, the device may alternatively or additionally report the regular one-shot labels (e.g., ground-truth labels at control points). In some aspects, the device may additionally or alternatively report IMU quality/drift parameters to the network or training system. The network or training system may then use this information to determine the frequency at which control points should be present in the data collection (e.g., where higher drift may call for more frequent control points).

Although not included in the illustrated example, in some aspects, the training system may use a variety of preprocessing operations on the CSI data 220. For example, the CSI data 220 may be measured on the uplink at each transceiver, and the training system may compute time-domain channel response by applying an inverse fast Fourier transform (IFFT) on the channel measurements measured at the pilot symbol locations.

In some aspects, as the moving device and transceivers may not be synchronized in time, the training system can further compensate, or at least adjust, for the drift in the preprocessing operations. The group delay offset may be correct for when the measurements are collected. As an example of such compensation or adjustment, the training system may perform line of sight (LoS) peak alignment. That is, the training system may remove the arbitrary time or phase shift of the transmission starting time by aligning LoS peaks in the data, as measured from each perspective (e.g., as measured by the device and the transceiver). To compensate/adjust for the clock offset drift, in some aspects, the training system may align the LoS peaks with a reference antenna. The first measured peak of the reference antenna may then be shifted to arrive at a fixed time point. The peak detection algorithm may shift the peak to a median bin value if a peak is not found on the reference antenna.

As another example, the training system may perform processing in the time domain. For example, the training system may obtain the signal-to-noise ratio (SNR) information for each antenna by computing the power on the pilot symbols and noise on the non-reference symbols. The training system may then drop antennas with a SNR below a threshold, and/or normalize the time-domain response per antenna.

Figure 3:
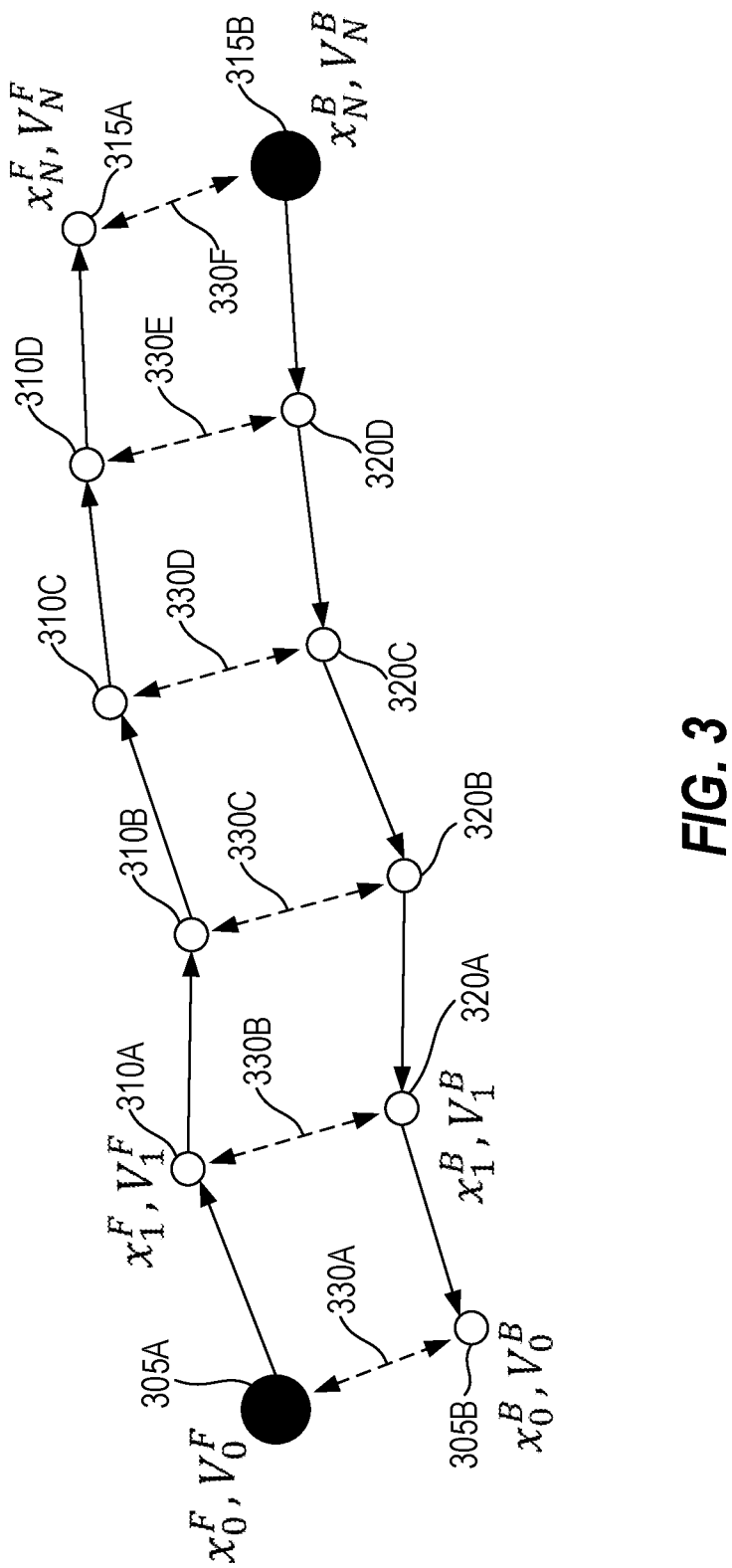
FIG. 3 depicts an example workflow for generating training data using forward and backward double integration, according to some aspects of the present disclosure.

Example Workflow for Generating Training Data Using Forward and Backward Double Integration FIG. 3 depicts an example workflow 300 for generating training data using forward and backward double integration. In some aspects, the workflow 300 provides additional detail for the trajectory-fitting operations performed by the trajectory-fitting component 215 of FIG. 2.

In the illustrated example, point 305A and point 315B correspond to ground-truth labels (e.g., determined based on the device passing a control point). That is, the positions $x_0^F$ and $x_N^B$, as well as velocities $V_0^F$ and $B_N^B$, may be ground-truth data collected based on the device recognizing a control point in an environment. As discussed above, the trajectory-fitting operation may be performed by applying two double integration operations to fit a trajectory using control points as endpoints of the trajectory: (1) a forward pass to predict positions at each timestamp, beginning with the data for a first control point (e.g., at point 305A) and ending at the timestamp that a second control point was reached (e.g., at point 315A), as well as (2) a backward pass to predict positions at each timestamp in reverse, beginning with the data for the second control point (e.g., at point 315B) and ending at the timestamp that the first control point was reached (e.g., at point 305B).

Specifically, in the illustrated example, the system uses one integration during a forward pass to predict a velocity at a subsequent point, adjacent to the first control point at point 305A, based on the velocity at the point 305A. That is, the system predicts $V_1^F$ for point 310A based on $V_0^F$ for point 305A and the measured IMU acceleration for the time step between points 305A and 310A (e.g., using Equation 1 above). Further, once the velocity $V_1^F$ for point 310A is predicted, the system may use a second integration to predict the position $x_1^F$ at point 310A based on the predicted velocity $V_1^F$ and the position $x_0^F$ of the prior point 305A (e.g., using Equation 2 above).

Once the velocity and position of point 310A have been predicted, the system can again use the double integration operation (e.g., using Equations 1 and 2 above) to predict velocity and position at point 310B based on the predicted velocity and position at point 310A (along with the measured/corrected acceleration vector for the time step between points 310A and 310B). This process continues iteratively for each time step (predicting data for point 310C based on the predictions at point 310B, predicting data for point 310D based on the predictions at point 310C, and so on) until the system reaches the timestamp of the next control point in the sequence of records (e.g., where the position and velocity are predicted for point 315A based on the predictions for point 310D). Because the timestamp for point 315A corresponds to a control point (e.g., ground-truth data is known for the timestamp), the trajectory-fitting component may stop the forward pass.

In this way, during the forward pass, the system can begin with ground-truth velocity and position (e.g., determined based on the control point at point 305A) for the first iteration, and at each time point/timestamp, use a prior prediction (from the prior timestamp) to predict the next or current values for the next or current timestamp.

As illustrated, the predictions generated during the forward integration may not align with the predictions during the backward pass, and/or with reality. For example, the predictions generated for point 315A during the forward pass (e.g., velocity $V_N^F$ and position $x_N^F$) may differ from the actual data (determined based on a control point) at the timestamp (indicated by point 315B, with velocity $V_N^B$ and position $x_N^B$). As discussed above, this may be due to various errors or noise in the IMU data.

As discussed above, performing a backwards integration can help remediate these errors. In the illustrated example, the system uses one integration during a backward pass to predict a velocity at a prior point, adjacent to the second control point at point 315B, based on the velocity at the point 315B. That is, the system predicts $V_{N-1}^B$ for point 320D based on VR for point 315B and the measured IMU acceleration for the time step between points 320D and 315B (e.g., using Equation 3 above). Further, once the velocity $V_{N-1}^B$ for point 320D is predicted, the system may use a second integration to predict the position $x_{N-1}^B$ at point 320D based on the predicted velocity $V_{N-1}^B$ and the position $x_N^B$ of the subsequent point 315B (e.g., using Equation 4 above).

Once the velocity and position of point 320d have been predicted, the system can again use the double integration operation (e.g., using Equations 3 and 4 above) to predict velocity and position at point 320C based on the predicted velocity and position at point 320D (along with the measured/corrected acceleration vector for the time step between points 320C and 320D). This process continues iteratively for each time point (predicting data for point 320B based on the predictions at point 320C, predicting data for point 320A based on the predictions at point 320B, and so on) until the system reaches the timestamp of the prior control point in the sequence of records (e.g., where the position and velocity are predicted for point 305B based on the predictions for point 320A).

In this way, during the backward pass, the system can begin with ground-truth velocity and position (e.g., determined based on the control point at point 315B) and, at each time point/timestamp, use the prior prediction (from the subsequent timestamp) to predict the next or current values for the prior or current timestamp.

As illustrated and discussed above, the predictions generated during the backward integration may similarly be misaligned with the predictions from the forward pass, and/or with reality. For example, the predictions generated for point 305B during the backward pass (e.g., velocity $V_0^B$ and position $x_0^B$) may differ from the actual data (determined based on a control point) at the timestamp (indicated by point 305A, with velocity $V_0^F$ and position $x_0^F$). As discussed above, this may be due to various errors or noise in the IMU data.

In the illustrated example, as indicated by the arrows 330A, 330B, 330C, 330D, 330E, and 330F (collectively, the arrows 330), the system can then generate or determine losses for each timestamp/time point based on the difference in values generated or determined during the forward pass and the backward pass. For example, using Equations 6, 7, and/or 8, the system may generate a position loss, velocity loss, and/or regularization loss for each time point. Specifically, as indicated by the arrow 330A, the predictions at point 305B are compared against the ground-truth values at point 305A to generate one or more loss terms. Similarly, as indicated by the arrow 330B, the predictions at point 310A are compared against the predictions at point 320A to generate one or more losses, the predictions at point 310B are compared against the predictions at point 320B (as indicated by the arrow 330C) to generate one or more loss terms, the predictions at point 310C are compared against the predictions at point 320C (as indicated by the arrow 330D) to generate one or more loss terms, the predictions at point 310D are compared against the predictions at point 320D (as indicated by the arrow 330E) to generate one or more loss terms, and the predictions at point 315A are compared against the ground-truth values at point 315B (as indicated by the arrow 330F) to generate one or more loss terms.

In some aspects, based on these losses for each timestamp, the system can refine the acceleration correction vectors (e.g., to minimize, or at least reduce, the losses at each time point). The acceleration correction parameter may be initialized in a variety of ways, such as using random values. After training, however, the value may be used to accurately correct acceleration data (e.g., using Equation 5 above). This trained parameter can thereby be used to generate pseudo-labels (e.g., accurate predicted positions) for each time stamp. For example, the system may use a double integration operation (e.g., a forward pass) to generate revised predictions for each timestamp using the learned acceleration correction parameter. These revised predictions can then be used as pseudo-labels for the timestamps.

As discussed above, by repeating the workflow 300 for each sequence of records (where each sequence includes a measured or detected control point at the beginning and end of the sequence), the system can generate a large volume of training data with accurate pseudo-labels with substantially reduced or eliminated manual effort (e.g., without involving manual labeling).

Example Workflow for Updating Pseudo-Labels Based on Trained Model Output

FIG. 4 depicts an example workflow 400 for updating pseudo-labels based on trained model output.

In some aspects, the accuracy of a trained machine learning model (trained based on pseudo-labels as discussed above) may meet or even surpass the accuracy of the pseudo-labels themselves. For example, when the density of training samples is sufficiently high (which is possible due to the automated labeling discussed above) and the model is trained on many samples with different label errors, the machine learning model can learn to generalize well, thereby reducing or eliminating these errors. In some aspects, as a result, the model may be used to refine the IMU trajectory fitting and/or label creation.

For example, in some aspects, the training system may create pseudo-labels with the forward-backward double integration operations discussed above. The training system may then initialize the machine learning model (e.g., using random weights) and train the model using the collected CSI data and the generated pseudo-labels (as well as ground-truth labels for control points, as discussed above). In some aspects, the training system may then use the trained model to predict positions for each record in the training set (e.g., using the CSI data in each record) and/or for newly collected CSI data. In some aspects, the training system can then create new pseudo-labels (or update the existing pseudo-labels) with forward-backward double integration operations in conjunction with the position predictions generated by the model. In some such aspects, the forward-backward scheme can now include an additional prediction point for each timestamp (generated by the model itself), and a position loss can be calculated between the positions predicted not only by the forward and backward passes, but also between these positions and the position predicted by the machine learning model.

In some aspects, these revised pseudo-labels can then be used as new labels (along with the prior collected CSI data) to refine the machine learning model and/or to train a new machine learning model from scratch (e.g., beginning with random parameters). In some aspects, this new or updated machine learning model may thereby exhibit improved accuracy, as compared to the prior model (trained based on pseudo-labels generated based only on the IMU data, and not based on machine learning model predictions). In an aspect, this process may be repeated or iterated any number of times (generating new model predictions and new pseudo-labels at each iteration, and training a new machine learning model using the new pseudo-labels) until various termination criteria are met, such as until a defined number of iterations have been performed (e.g., specified as a hyperparameter).

The workflow 400 depicts one example process for creating such updated labels. In the illustrated example, for each given timestamp (e.g., at timestamp i), predictions (e.g., $x_i^F$ and $V_i^F$) at a first point 405 can be generated during the forward pass of the forward-backward double integration operation. Similarly, as illustrated by point 410, predictions (e.g., $x_i^B$ and $V_i^B$) can be generated for the same timestamp during the backward pass of the forward-backward double integration operation. As discussed above, these predictions can be used to train an acceleration correction parameter, which can then be used to generate a pseudo-label for the timestamp i. This pseudo-label can then be used to train a machine learning model to generate position predictions, as discussed above.

In the illustrated workflow 400, a position prediction $x_i^{Model}$ (e.g., point 415) from the trained machine learning model can then be generated by processing the CSI data for the timestamp i using the trained model. In the depicted example, as illustrated by the arrows 430A, 430B, and 430C (collectively, the arrows 430), the training system may then generate additional loss terms based on these new positions. For example, as illustrated, the training system can compute a first positional loss (represented by arrow 430A) based on comparing the position predictions at the point 405 (generated during the forward double integration) and the point 415 (generated by the model). The system may similarly generate a second positional loss (represented by arrow 430B) based on comparing the position predictions at the point 410 (generated during the backward double integration) and the point 415 (generated by the model). In some aspects, the training system may refrain from computing a positional loss (represented by arrow 430C) between points 405 and 410 (e.g., between the backward and forward passes) during creation of the revised or updated pseudo-label. That is, the system may compute a velocity loss between these points (as the model prediction may not include velocity), but compute positional losses only with respect to the model prediction at point 415.

As discussed above, these new losses can then be used to further refine or train the acceleration correction parameter. The updated acceleration correction parameter can then be used to generate an updated, revised, or new pseudo-label for the timestamp i (e.g., using a single forward pass of the double integration, as discussed above). This updated training data can then be used to train a new machine learning model, as discussed above, and the process may be repeated any number of times.

Figure 5:
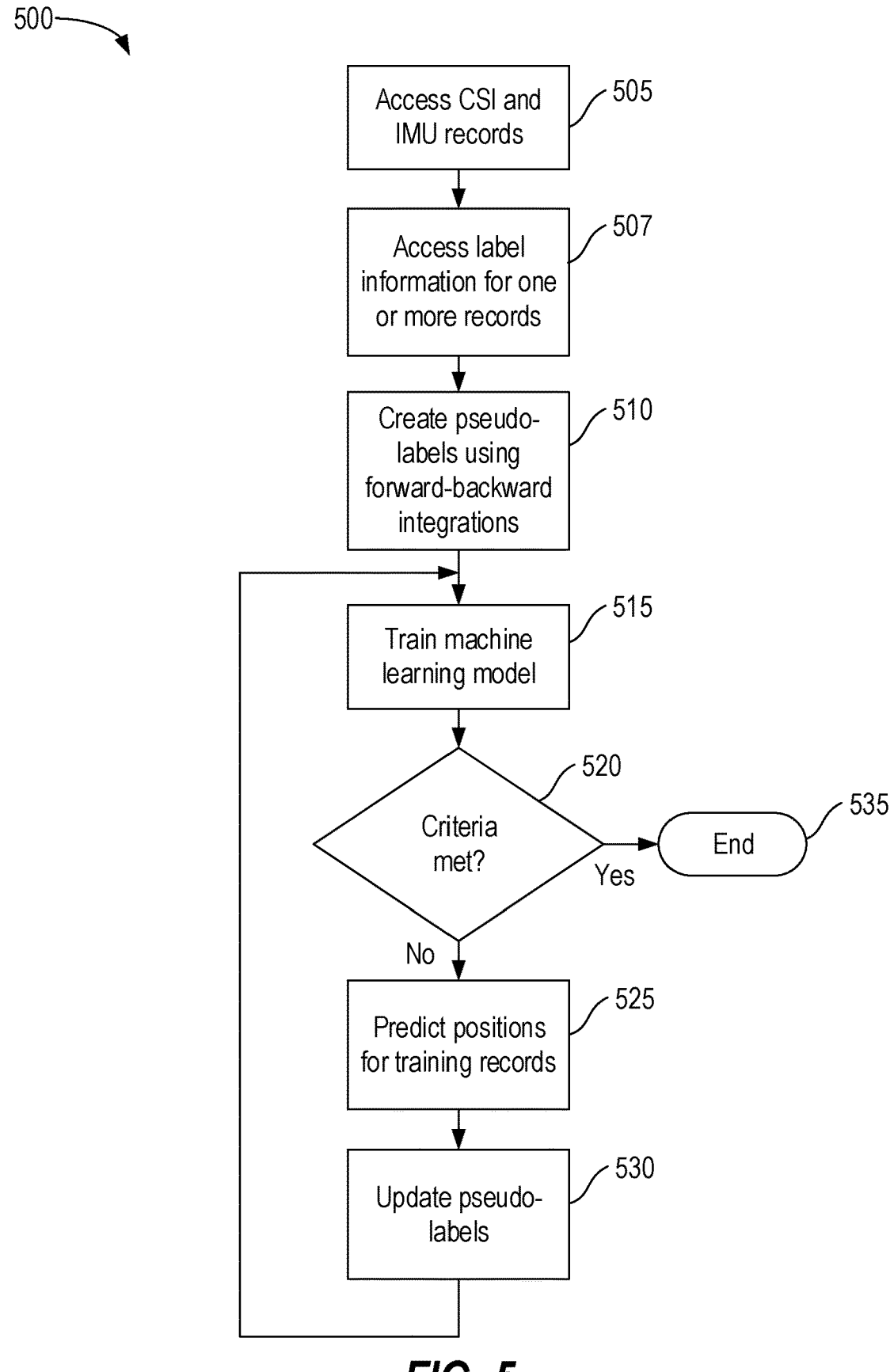
FIG. 5 is a flow diagram depicting an example method for generating training data and training machine learning models to perform localization, according to some aspects of the present disclosure.

Example Method for Generating Training Data and Training Machine Learning Models to Perform Localization FIG. 5 is a flow diagram depicting an example method 500 for generating training data and training machine learning models to perform localization. In some aspects, the method 500 is performed by a training system (e.g., by the trajectory-fitting component 215 of FIG. 2 and/or the training component 230 of FIG. 2).

At block 505, the training system accesses CSI and IMU records. For example, as discussed above, one or more UEs or other devices moving in a physical environment may collect or generate CSI data and/or IMU data at intervals. In some aspects, the CSI data may additionally or alternatively be measured by other devices, such as by the transceivers or by the network itself.

At block 507, the training system accesses label information (e.g., position, velocity, and/or acceleration information) for one or more of the records. For example, as discussed above, records corresponding to when the device passed over or near a control point may have known or ground-truth position, velocity, and/or acceleration information. This known information can be used to create pseudo-labels for remaining records using forward-backward double integration, as discussed above.

At block 510, the training system creates pseudo-labels for the CSI data based on the IMU data using a forward-backward double integration operation, as discussed above. One example method to generate the pseudo-labels is discussed in more detail below with reference to FIG. 6.

At block 515, the training system trains a machine learning model to generate position predictions based on CSI data, as discussed above. Generally, the particular techniques used to train the model may vary depending on the particular implementation. For example, if the model is a neural network, the training system may use a record of CSI data (or multiple records) as input to generate a prediction (e.g., predicted location, velocity, and/or acceleration of the device). This prediction can then be compared against the label (or pseudo-label) for the record(s) to generate a loss, which can then be used to refine the model (e.g., using backpropagation). In this way, the model learns (based on labeled data and pseudo-labeled data) to generate more accurate predictions.

At block 520, the training system determines whether one or more termination criteria are satisfied. For example, as discussed above, evaluating the termination criteria may include determining whether the model (trained at block 515) meets or exceeds a desired minimum accuracy, determining whether a defined number of training iterations have been completed, and so on. If, at block 520, the training system determines that the termination criteria are satisfied, then the method 500 terminates at block 535.

If, at block 520, the training system determines that the termination criteria are not satisfied, then the method 500 proceeds to block 525. At block 525, the training system predicts positions for each training record by processing the CSI measurements of each record using the model (trained at block 515).

At block 530, the training system can then update the pseudo-labels (or generate new pseudo-labels) for the training records based on the model predictions, as discussed above. For example, the training system may generate one or more additional loss term(s) for each timestamp based on comparing the model predictions and the forward-backward double integration predictions. These loss terms may then be used to refine the acceleration correction parameter, which can then be used to generate updated pseudo-labels, as discussed above. The method 500 then returns to block 515 to train a new machine learning model based on the new pseudo-labels, which may include training a new model from scratch (e.g., from randomized parameters) and/or refining the prior-trained model.

Example Method for Generating Pseudo-Labels

FIG. 6 is a flow diagram depicting an example method 600 for generating pseudo-labels. In some aspects, the method 600 is performed by a training system (e.g., by the training system discussed above with reference to FIG. 5, and/or by the trajectory-fitting component 215 of FIG. 2 and/or the training component 230 of FIG. 2). In some aspects, the method 600 provides additional detail for block 510 of FIG. 5.

At block 605, the training system selects a pair of control points indicated in the accessed records. That is, the training system may identify the timestamps or records having ground-truth labels (determined at block 507), and select two such records. In some aspects, the training system selects adjacent control points (e.g., two timestamps having ground-truth data, where no timestamps between the two selected timestamps have ground-truth data). For example, the training system may select a first control point, and then evaluate each subsequent timestamp until another (adjacent) control point is found. This adjacent point can then also be selected to form the pair. In some aspects, the training system can use any suitable technique to select the control points (including random or pseudo-random selection).

At block 610, the training system generates one or more predictions (e.g., position, velocity, and/or acceleration predictions) for a timestamp (e.g., for the timestamp or record immediately after the first control point) based on the information of the immediately prior point or timestamp. For example, in the first iteration, the training system may generate a prediction for a first timestamp based on the ground-truth label for the first control point. During a subsequent iteration, the training system may generate a prediction for the next timestamp based on the prediction for the first timestamp. As discussed above, in some aspects, this is referred to as the forward pass.

At block 615, the training system determines whether the second control point (in the selected pair) has been reached. That is, the training system determines whether the prediction (generated at block 610) corresponds to the timestamp of the second control point. If not, the method 600 returns to block 610 to generate another prediction for the next timestamp. If the training system determines that the second control point has been reached, the method 600 continues to block 620.

At block 620, the training system generates one or more predictions (e.g., position, velocity, and/or acceleration predictions) for a timestamp (e.g., for the timestamp or record immediately prior to the second control point) based on the information of the immediately subsequent point or timestamp. For example, in the first iteration, the training system may generate a prediction for a given timestamp based on the ground-truth label for the second control point. During a subsequent iteration, the training system may generate a prediction for the prior timestamp based on the prediction for the given timestamp. As discussed above, in some aspects, this is referred to as the backward pass.

At block 625, the training system determines whether the first control point (in the selected pair) has been reached. That is, the training system determines whether the prediction (generated at block 620) corresponds to the timestamp of the first control point. If not, the method 600 returns to block 620 to generate another prediction for the next prior timestamp. If the training system determines that the first control point has been reached, the method 600 continues to block 630.

At block 630, the training system generates one or more losses based on the predictions for each timestamp. For example, as discussed above, the training system may generate a positional loss and/or velocity loss for each respective timestamp based on comparing the respective forward pass predictions (e.g., the prediction generated at block 610 for the respective timestamp) and the respective backwards pass predictions (e.g., the prediction generated at block 620 for the respective timestamp).

At block 635, the training system updates the acceleration correction parameter based on the losses. Although the illustrated example depicts updating the acceleration correction parameter based on a single trajectory (e.g., a single pair of control points), in some aspects, the training system may alternatively generate losses for multiple such sequences prior to updating the acceleration correction parameter.

At block 640, the training system determines whether one or more termination criteria are met. Generally, the particular criteria may vary depending on the particular implementation. For example, the training system may determine whether any additional sequences (e.g., pairs of control points) remain in the training data, whether the change in the acceleration correction parameter is below a threshold (e.g., whether training has slowed), and the like. If, at block 640, the training system determines that the termination criteria are not met, the method 600 returns to block 605.

If, at block 640, the training system determines that the termination criteria are met, the method 600 continues to block 645. At block 645, the training system generates one or more pseudo-labels for the training data based on the acceleration control parameter. For example, as discussed above, the training system may perform another forward pass using the updated acceleration correction parameter (e.g., performing blocks 605 through 615) to generate an updated prediction for each timestamp that does not correspond to a control point.

In this way, as discussed above, the pseudo-labels can be used to provide supervision for the non-control point timestamps, while the ground-truth information can provide supervision for the control point timestamps. This substantially improves model accuracy and performance.

Example Method for Training Machine Learning Models to Perform Localization

FIG. 7 is a flow diagram depicting an example method 700 for training machine learning models to perform localization.

At block 705, a sequence of data records, each respective data record in the sequence of data records comprising a respective set of one or more wireless channel measurements and a respective set of inertial measurement unit (IMU) data, is accessed.

At block 710, known position information corresponding to at least a first data record of the sequence of data records is accessed.

At block 715, a first sequence of positions is determined based on processing the sets of IMU data and at least a subset of the known position information using a forward double integration operation.

In some aspects, determining the first sequence of positions using the forward double integration operation comprises: determining an initial velocity, an initial acceleration, and an initial position indicated by the first data record, of the sequence of data records, corresponding to a first control point, generating a first sequence of velocities beginning with the initial velocity and ending with a predicted final velocity based on the initial velocity and the initial acceleration, and generating the first sequence of positions beginning with the initial position and ending with a predicted final position based on the initial position and the first sequence of velocities.

At block 720, a second sequence of positions is determined based on processing the sets of IMU data and at least a subset of the known position information using a backward double integration operation.

In some aspects, determining the second sequence of positions using the backward double integration operation comprises: determining an actual final velocity, an actual final acceleration, and an actual final position reflected by a third data record, of the sequence of data records, corresponding to a second control point, generating a second sequence of velocities beginning with the actual final velocity and ending with a predicted initial velocity based on the actual final velocity and the actual final acceleration, and generating the second sequence of positions beginning with the actual final position and ending with a predicted initial position based on the actual final position and the second sequence of velocities.

At block 725, an IMU adjustment parameter is generated based on the first and second sequences of positions.

In some aspects, the IMU adjustment parameter is generated based on a first loss defined based on the first and second sequences of positions and a second loss defined based on the first and second sequences of velocities.

In some aspects, the IMU adjustment parameter is generated based further on a regularization loss.

At block 730, a pseudo-label for a second data record of the sequence of data records is generated based on the IMU adjustment parameter and the sets of IMU data.

In some aspects, generating the pseudo-label comprises: determining an initial velocity and an initial position indicated by the first data record corresponding to a control point, generating, based on the initial velocity and the IMU adjustment parameter, a first sequence of velocities beginning with the initial velocity and ending with a predicted velocity for the second data record, and generating, based on the initial position and the first sequence of velocities, a third sequence of positions beginning with the initial position and ending with a predicted position for the second data record.

At block 735, a machine learning model is trained, based on the second data record and the pseudo-label, to predict positions based on wireless channel measurements.

In some aspects, the method 700 further includes generating an updated position prediction based on processing a wireless channel measurement from the second data record using the machine learning model generating an updated pseudo-label based at least in part on the updated position prediction, and training a second machine learning model, based on the updated pseudo-label, to predict positions based on wireless channel measurements.

In some aspects, generating the updated pseudo-label comprises: generating a first positional loss based on the updated position prediction and a first position prediction generated for the second data record during the forward double integration operation, generating a second positional loss based on the updated position prediction and a second position prediction generated for the second data record during the backward double integration operation, updating the IMU adjustment parameter based on the first and second positional losses, and generating the updated pseudo-label based on the updated IMU adjustment parameter.

Example Processing System for Machine Learning

Figure 8:
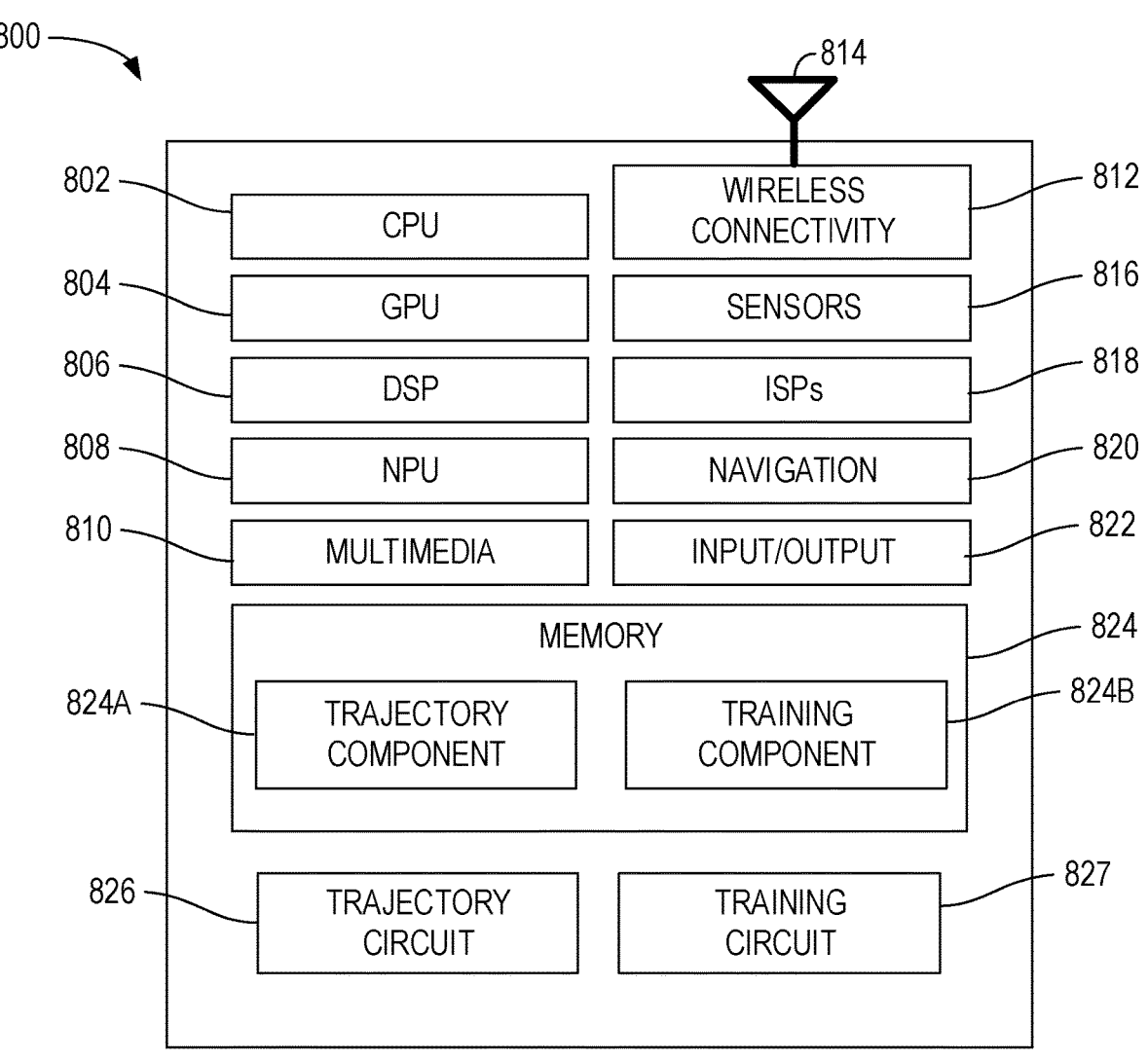
FIG. 8 depicts an example processing system configured to perform various aspects of the present disclosure.

In some aspects, the workflows, techniques, and methods described with reference to FIGS. 1-7 may be implemented on one or more devices or systems. FIG. 8 depicts an example processing system 800 configured to perform various aspects of the present disclosure, including, for example, the techniques and methods described with respect to FIGS. 1-7. In some aspects, the processing system 800 may correspond to a training system. For example, the processing system 800 may correspond to a device that generates pseudo-labels for CSI data and/or trains machine learning models based on the labeled data. Although depicted as a single system for conceptual clarity, in some aspects, as discussed above, the operations described below with respect to the processing system 800 may be distributed across any number of devices or systems.

Processing system 800 includes a central processing unit (CPU) 802, which in some examples may be a multi-core CPU. Instructions executed at the CPU 802 may be loaded, for example, from a program memory associated with the CPU 802 or may be loaded from a memory partition (e.g., a partition of memory 824).

Processing system 800 also includes additional processing components tailored to specific functions, such as a graphics processing unit (GPU) 804, a digital signal processor (DSP) 806, a neural processing unit (NPU) 808, a multimedia component 810 (e.g., a multimedia processing unit), and a wireless connectivity component 812.

An NPU, such as NPU 808, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., Long-Term Evolution LTE), fifth generation (5G) connectivity (e.g., New Radio (NR)), Wi-Fi connectivity, Bluetooth connectivity, and other wireless data transmission standards. Wireless connectivity component 812 is further connected to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes a trajectory component 824A and a training component 824B. Although not depicted in the illustrated example, the memory 824 may also include other data such as model parameters for one or more models (e.g., machine learning models), training data (e.g., CSI data and corresponding IMU data and/or labels), acceleration correction parameters, and the like. Though depicted as discrete components for conceptual clarity in FIG. 8, the illustrated components (and others not depicted) may be collectively or individually implemented in various aspects.

Processing system 800 further comprises a trajectory circuit 826 and a training circuit 827. The depicted circuits, and others not depicted, may be configured to perform various aspects of the techniques described herein.

For example, the trajectory component 824A and/or trajectory circuit 826 (which may correspond to the trajectory-fitting component 215 of FIG. 2) may be used to perform trajectory fitting using a forward-backward double integration operation, as discussed above, to generate pseudo-labels for CSI data. The training component 824B and/or training circuit 827 (which may correspond to the training component 230 of FIG. 2) may be used to train machine learning models based on labels and/or pseudo-labels for CSI data to predict positions based on CSI data, and/or to evaluate model performance for iterative training, as discussed above.

Though depicted as separate components and circuits for clarity in FIG. 8, trajectory circuit 826 and training circuit 827 may collectively or individually be implemented in other processing devices of processing system 800, such as within CPU 802, GPU 804, DSP 806, NPU 808, and the like.

Generally, processing system 800 and/or components thereof may be configured to perform the methods described herein.

Notably, in other aspects, aspects of processing system 800 may be omitted, such as where processing system 800 is a server computer or the like. For example, multimedia component 810, wireless connectivity component 812, sensor processing units 816, ISPs 818, and/or navigation processor 820 may be omitted in other aspects. Further, aspects of processing system 800 maybe distributed between multiple devices.

Example Clauses

Implementation examples are described in the following numbered clauses:

Clause 1: A method, comprising: accessing a sequence of data records, each respective data record in the sequence of data records comprising a respective set of one or more wireless channel measurements and a respective set of inertial measurement unit (IMU) data; accessing known position information corresponding to at least a first data record of the sequence of data records; determining a first sequence of positions based on processing the sets of IMU data and at least a subset of the known position information using a forward double integration operation; determining a second sequence of positions based on processing the sets of IMU data and at least a subset of the known position information using a backward double integration operation; generating an IMU adjustment parameter based on the first and second sequences of positions; generating a pseudo-label for a second data record of the sequence of data records based on the IMU adjustment parameter and the sets of IMU data; and training a machine learning model, based on the second data record and the pseudo-label, to predict positions based on wireless channel measurements.

Clause 2: A method according to Clause 1, wherein determining the first sequence of positions using the forward double integration operation comprises: determining an initial velocity, an initial acceleration, and an initial position indicated by the first data record, of the sequence of data records, corresponding to a first control point; generating a first sequence of velocities beginning with the initial velocity and ending with a predicted final velocity based on the initial velocity and the initial acceleration; and generating the first sequence of positions beginning with the initial position and ending with a predicted final position based on the initial position and the first sequence of velocities.

Clause 3: A method according to Clause 2, wherein determining the second sequence of positions using the backward double integration operation comprises: determining an actual final velocity, an actual final acceleration, and an actual final position reflected by a third data record, of the sequence of data records, corresponding to a second control point; generating a second sequence of velocities beginning with the actual final velocity and ending with a predicted initial velocity based on the actual final velocity and the actual final acceleration; and generating the second sequence of positions beginning with the actual final position and ending with a predicted initial position based on the actual final position and the second sequence of velocities.

Clause 4: A method according to Clause 3, wherein the IMU adjustment parameter is generated based on a first loss defined based on the first and second sequences of positions and a second loss defined based on the first and second sequences of velocities.

Clause 5: A method according to Clause 4, wherein the IMU adjustment parameter is generated based further on a regularization loss.

Clause 6: A method according to any of Clauses 1-5, further comprising: generating an updated position prediction based on processing a wireless channel measurement from the second data record using the machine learning model; generating an updated pseudo-label based at least in part on the updated position prediction; and training a second machine learning model, based on the updated pseudo-label, to predict positions based on wireless channel measurements.

Clause 7: A method according to Clause 6, wherein generating the updated pseudo-label comprises: generating a first positional loss based on the updated position prediction and a first position prediction generated for the second data record during the forward double integration operation; generating a second positional loss based on the updated position prediction and a second position prediction generated for the second data record during the backward double integration operation; updating the IMU adjustment parameter based on the first and second positional losses; and generating the updated pseudo-label based on the updated IMU adjustment parameter.

Clause 8: A method according to any of Clauses 1-7, wherein generating the pseudo-label comprises: determining an initial velocity and an initial position indicated by the first data record corresponding to a control point; generating, based on the initial velocity and the IMU adjustment parameter, a first sequence of velocities beginning with the initial velocity and ending with a predicted velocity for the second data record; and generating, based on the initial position and the first sequence of velocities, a third sequence of positions beginning with the initial position and ending with a predicted position for the second data record.

Clause 9: A processing system comprising: a memory comprising computer-executable instructions; and one or more processors configured to execute the computer-executable instructions and cause the processing system to perform a method in accordance with any of Clauses 1-8.

Clause 10: A processing system comprising means for performing a method in accordance with any of Clauses 1-8.

Clause 11: A non-transitory computer-readable medium comprising computer-executable instructions that, when executed by one or more processors of a processing system, cause the processing system to perform a method in accordance with any of Clauses 1-8.

Clause 12: A computer program product embodied on a computer-readable storage medium comprising code for performing a method in accordance with any of Clauses 1-8.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
accessing a sequence of data records, each respective data record in the sequence of data records comprising a respective set of one or more wireless channel measurements and a respective set of inertial measurement unit (IMU) data;
accessing known position information corresponding to at least a first data record of the sequence of data records;
determining a first sequence of positions based on processing the sets of IMU data and at least a subset of the known position information using a forward double integration operation;
determining a second sequence of positions based on processing the sets of IMU data and at least a subset of the known position information using a backward double integration operation;
generating an IMU adjustment parameter based on the first and second sequences of positions;
generating a pseudo-label for a second data record of the sequence of data records based on the IMU adjustment parameter and the sets of IMU data; and
training a machine learning model, based on the second data record and the pseudo-label, to predict positions based on one or more wireless channel measurements.

2. The processor-implemented method of claim 1, wherein determining the first sequence of positions using the forward double integration operation comprises:
determining an initial velocity, an initial acceleration, and an initial position indicated by the first data record, of the sequence of data records, corresponding to a first control point;

generating a first sequence of velocities beginning with the initial velocity and ending with a predicted final velocity based on the initial velocity and the initial acceleration; and
generating the first sequence of positions beginning with the initial position and ending with a predicted final position based on the initial position and the first sequence of velocities.

3. The processor-implemented method of claim 2, wherein determining the second sequence of positions using the backward double integration operation comprises:
determining an actual final velocity, an actual final acceleration, and an actual final position reflected by a third data record, of the sequence of data records, corresponding to a second control point;
generating a second sequence of velocities beginning with the actual final velocity and ending with a predicted initial velocity based on the actual final velocity and the actual final acceleration; and
generating the second sequence of positions beginning with the actual final position and ending with a predicted initial position based on the actual final position and the second sequence of velocities.

4. The processor-implemented method of claim 3, wherein the IMU adjustment parameter is generated based on a first loss defined based on the first and second sequences of positions and a second loss defined based on the first and second sequences of velocities.

5. The processor-implemented method of claim 4, wherein the IMU adjustment parameter is generated based further on a regularization loss.

6. The processor-implemented method of claim 1, further comprising:
generating an updated position prediction based on processing a wireless channel measurement from the second data record using the machine learning model;
generating an updated pseudo-label based at least in part on the updated position prediction; and
training a second machine learning model, based on the updated pseudo-label, to predict positions based on one or more wireless channel measurements.

7. The processor-implemented method of claim 6, wherein generating the updated pseudo-label comprises:
generating a first positional loss based on the updated position prediction and a first position prediction generated for the second data record during the forward double integration operation;
generating a second positional loss based on the updated position prediction and a second position prediction generated for the second data record during the backward double integration operation;
updating the IMU adjustment parameter based on the first and second positional losses; and
generating the updated pseudo-label based on the updated IMU adjustment parameter.

8. The processor-implemented method of claim 1, wherein generating the pseudo-label comprises:
determining an initial velocity and an initial position indicated by the first data record corresponding to a control point;
generating, based on the initial velocity and the IMU adjustment parameter, a first sequence of velocities beginning with the initial velocity and ending with a predicted velocity for the second data record; and
generating, based on the initial position and the first sequence of velocities, a third sequence of positions beginning with the initial position and ending with a predicted position for the second data record.

9. A processing system comprising:
one or more memories comprising computer-executable instructions; and
one or more processors configured to execute the computer-executable instructions and cause the processing system to perform an operation comprising:
accessing a sequence of data records, each respective data record in the sequence of data records comprising a respective set of one or more wireless channel measurements and a respective set of inertial measurement unit (IMU) data;
accessing known position information corresponding to at least a first data record of the sequence of data records;
determining a first sequence of positions based on processing the sets of IMU data and at least a subset of the known position information using a forward double integration operation;
determining a second sequence of positions based on processing the sets of IMU data and at least a subset of the known position information using a backward double integration operation;
generating an IMU adjustment parameter based on the first and second sequences of positions;
generating a pseudo-label for a second data record of the sequence of data records based on the IMU adjustment parameter and the sets of IMU data; and
training a machine learning model, based on the second data record and the pseudo-label, to predict positions based on one or more wireless channel measurements.

10. The processing system of claim 9, wherein determining the first sequence of positions using the forward double integration operation comprises:
determining an initial velocity, an initial acceleration, and an initial position indicated by the first data record, of the sequence of data records, corresponding to a first control point;
generating a first sequence of velocities beginning with the initial velocity and ending with a predicted final velocity based on the initial velocity and the initial acceleration; and
generating the first sequence of positions beginning with the initial position and ending with a predicted final position based on the initial position and the first sequence of velocities.

11. The processing system of claim 10, wherein determining the second sequence of positions using the backward double integration operation comprises:
determining an actual final velocity, an actual final acceleration, and an actual final position reflected by a third data record, of the sequence of data records, corresponding to a second control point;
generating a second sequence of velocities beginning with the actual final velocity and ending with a predicted initial velocity based on the actual final velocity and the actual final acceleration; and
generating the second sequence of positions beginning with the actual final position and ending with a predicted initial position based on the actual final position and the second sequence of velocities.

12. The processing system of claim 11, wherein the IMU adjustment parameter is generated based on a first loss defined based on the first and second sequences of positions and a second loss defined based on the first and second sequences of velocities.

13. The processing system of claim 12, wherein the IMU adjustment parameter is generated based further on a regularization loss.

14. The processing system of claim 9, the operation further comprising:
generating an updated position prediction based on processing a wireless channel measurement from the second data record using the machine learning model;
generating an updated pseudo-label based at least in part on the updated position prediction; and
training a second machine learning model, based on the updated pseudo-label, to predict positions based on one or more wireless channel measurements.

15. The processing system of claim 14, wherein generating the updated pseudo-label comprises:
generating a first positional loss based on the updated position prediction and a first position prediction generated for the second data record during the forward double integration operation;
generating a second positional loss based on the updated position prediction and a second position prediction generated for the second data record during the backward double integration operation;
updating the IMU adjustment parameter based on the first and second positional losses; and
generating the updated pseudo-label based on the updated IMU adjustment parameter.

16. The processing system of claim 9, wherein generating the pseudo-label comprises:
determining an initial velocity and an initial position indicated by the first data record corresponding to a control point;
generating, based on the initial velocity and the IMU adjustment parameter, a first sequence of velocities beginning with the initial velocity and ending with a predicted velocity for the second data record; and
generating, based on the initial position and the first sequence of velocities, a third sequence of positions beginning with the initial position and ending with a predicted position for the second data record.

17. One or more non-transitory computer-readable media comprising computer-executable instructions that, when executed by one or more processors of a processing system, cause the processing system to perform an operation comprising:
accessing a sequence of data records, each respective data record in the sequence of data records comprising a respective set of one or more wireless channel measurements and a respective set of inertial measurement unit (IMU) data;
accessing known position information corresponding to at least a first data record of the sequence of data records;
determining a first sequence of positions based on processing the sets of IMU data and at least a subset of the known position information using a forward double integration operation;
determining a second sequence of positions based on processing the sets of IMU data and at least a subset of the known position information using a backward double integration operation;
generating an IMU adjustment parameter based on the first and second sequences of positions;

generating a pseudo-label for a second data record of the sequence of data records based on the IMU adjustment parameter and the sets of IMU data; and training a machine learning model, based on the second data record and the pseudo-label, to predict positions based on one or more wireless channel measurements.

18. The one or more non-transitory computer-readable media of claim 17, wherein determining the first sequence of positions using the forward double integration operation comprises:

determining an initial velocity, an initial acceleration, and an initial position indicated by the first data record, of the sequence of data records, corresponding to a first control point;

generating a first sequence of velocities beginning with the initial velocity and ending with a predicted final velocity based on the initial velocity and the initial acceleration; and generating the first sequence of positions beginning with the initial position and ending with a predicted final position based on the initial position and the first sequence of velocities.

19. The one or more non-transitory computer-readable media of claim 18, wherein determining the second sequence of positions using the backward double integration operation comprises:

determining an actual final velocity, an actual final acceleration, and an actual final position reflected by a third data record, of the sequence of data records, corresponding to a second control point;

generating a second sequence of velocities beginning with the actual final velocity and ending with a predicted initial velocity based on the actual final velocity and the actual final acceleration; and generating the second sequence of positions beginning with the actual final position and ending with a predicted initial position based on the actual final position and the second sequence of velocities.

20. The one or more non-transitory computer-readable media of claim 19, wherein the IMU adjustment parameter is generated based on a first loss defined based on the first and second sequences of positions and a second loss defined based on the first and second sequences of velocities.

21. The one or more non-transitory computer-readable media of claim 20, wherein the IMU adjustment parameter is generated based further on a regularization loss.

22. The one or more non-transitory computer-readable media of claim 17, the operation further comprising:

generating an updated position prediction based on processing a wireless channel measurement from the second data record using the machine learning model;

generating an updated pseudo-label based at least in part on the updated position prediction; and training a second machine learning model, based on the updated pseudo-label, to predict positions based on one or more wireless channel measurements.

23. The one or more non-transitory computer-readable media of claim 22, wherein generating the updated pseudo-label comprises:

generating a first positional loss based on the updated position prediction and a first position prediction generated for the second data record during the forward double integration operation;

generating a second positional loss based on the updated position prediction and a second position prediction generated for the second data record during the backward double integration operation;

updating the IMU adjustment parameter based on the first and second positional losses; and generating the updated pseudo-label based on the updated IMU adjustment parameter.

24. The one or more non-transitory computer-readable media of claim 17, wherein generating the pseudo-label comprises:

determining an initial velocity and an initial position indicated by the first data record corresponding to a control point;

generating, based on the initial velocity and the IMU adjustment parameter, a first sequence of velocities beginning with the initial velocity and ending with a predicted velocity for the second data record; and generating, based on the initial position and the first sequence of velocities, a third sequence of positions beginning with the initial position and ending with a predicted position for the second data record.

25. A processing system, comprising:

means for accessing a sequence of data records, each respective data record in the sequence of data records comprising a respective set of one or more wireless channel measurements and a respective set of inertial measurement unit (IMU) data;

means for accessing known position information corresponding to at least a first data record of the sequence of data records;

means for determining a first sequence of positions based on processing the sets of IMU data and at least a subset of the known position information using a forward double integration operation;

means for determining a second sequence of positions based on processing the sets of IMU data and at least a subset of the known position information using a backward double integration operation;

means for generating an IMU adjustment parameter based on the first and second sequences of positions;

means for generating a pseudo-label for a second data record of the sequence of data records based on the IMU adjustment parameter and the sets of IMU data; and means for training a machine learning model, based on the second data record and the pseudo-label, to predict positions based on one or more wireless channel measurements.

26. The processing system of claim 25, wherein the means for determining the first sequence of positions using the forward double integration operation comprise:

means for determining an initial velocity, an initial acceleration, and an initial position indicated by the first data record, of the sequence of data records, corresponding to a first control point;

means for generating a first sequence of velocities beginning with the initial velocity and ending with a predicted final velocity based on the initial velocity and the initial acceleration; and means for generating the first sequence of positions beginning with the initial position and ending with a predicted final position based on the initial position and the first sequence of velocities.

27. The processing system of claim 26, the means for wherein determining the second sequence of positions using the backward double integration operation comprise:

means for determining an actual final velocity, an actual final acceleration, and an actual final position reflected by a third data record, of the sequence of data records, corresponding to a second control point;

means for generating a second sequence of velocities beginning with the actual final velocity and ending with a predicted initial velocity based on the actual final velocity and the actual final acceleration; and means for generating the second sequence of positions beginning with the actual final position and ending with a predicted initial position based on the actual final position and the second sequence of velocities.

28. The processing system of claim 25, further comprising:

means for generating an updated position prediction based on processing a wireless channel measurement from the second data record using the machine learning model;

means for generating an updated pseudo-label based at least in part on the updated position prediction; and means for training a second machine learning model, based on the updated pseudo-label, to predict positions based on one or more wireless channel measurements.

29. The processing system of claim 28, wherein the means for generating the updated pseudo-label comprise:

means for generating a first positional loss based on the updated position prediction and a first position prediction generated for the second data record during the forward double integration operation;

means for generating a second positional loss based on the updated position prediction and a second position prediction generated for the second data record during the backward double integration operation;

means for updating the IMU adjustment parameter based on the first and second positional losses; and means for generating the updated pseudo-label based on the updated IMU adjustment parameter.

30. The processing system of claim 25, wherein the means for generating the pseudo-label comprise:

means for determining an initial velocity and an initial position indicated by the first data record corresponding to a control point;

means for generating, based on the initial velocity and the IMU adjustment parameter, a first sequence of velocities beginning with the initial velocity and ending with a predicted velocity for the second data record; and means for generating, based on the initial position and the first sequence of velocities, a third sequence of positions beginning with the initial position and ending with a predicted position for the second data record.

* * * * *